July 28, 1964   D. F. KELLEY   3,142,494
BOAT TRAILER
Filed May 31, 1962
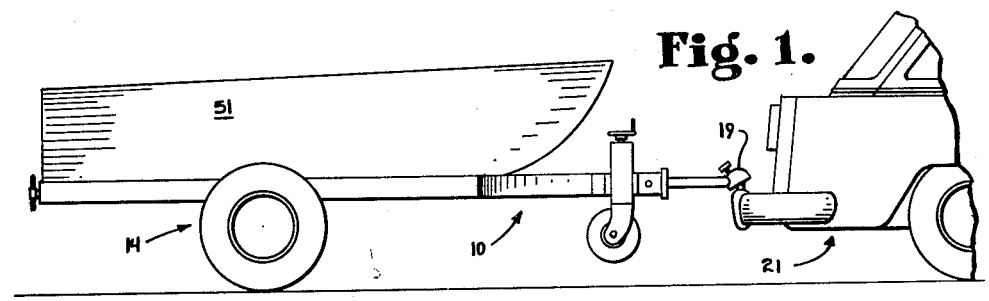
Fig. 1.
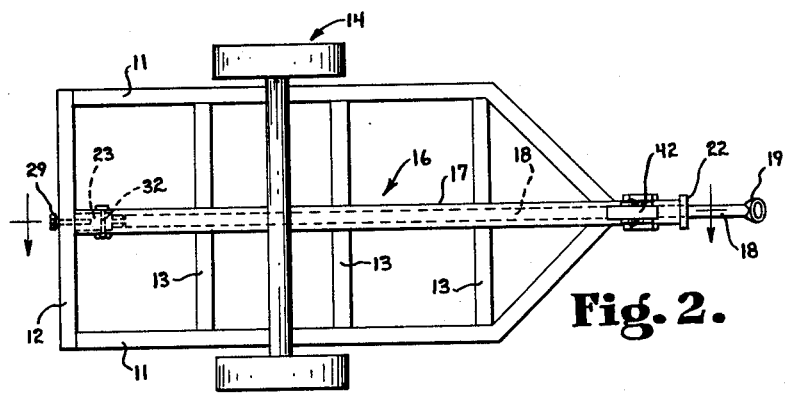
Fig. 2.
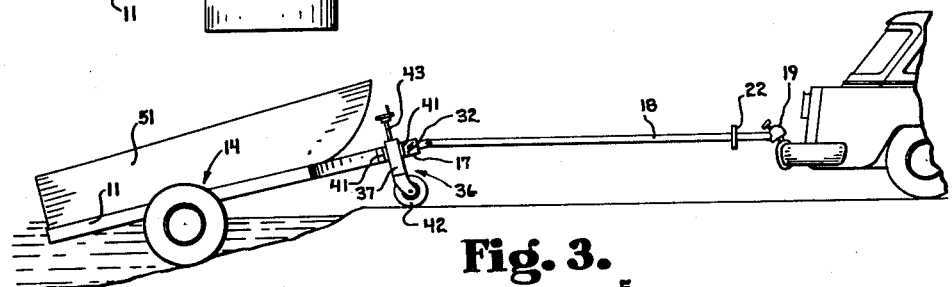
Fig. 3.
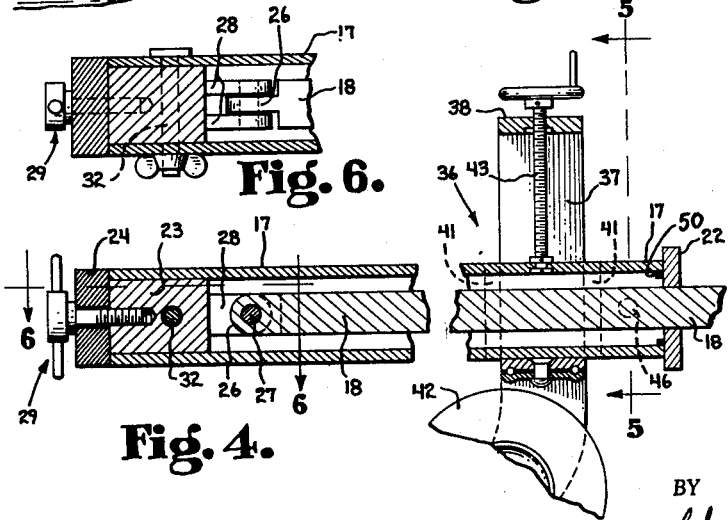
Fig. 6.
Fig. 4.
Fig. 5.
INVENTOR.
DONALD F. KELLEY
BY
Lockwood, Woodard, Smith & Weikart
Attorneys

3,142,494
BOAT TRAILER
Donald F. Kelley, 526 W. 23rd St., Connersville, Ind.
Filed May 31, 1962, Ser. No. 198,973
2 Claims. (Cl. 280—414)

This invention relates generally to automobile drawn trailers for transporting light boats and in particular to a trailer structure particularly adapted for launching and recovering boats under somewhat adverse shore line conditions.

In launching boats of the type referred to adverse shore line conditions often prevent backing of the towing automobile to the water's edge. Under these conditions the trailer must either be unhitched and rolled into the water for launching of the boat or the boat must be lifted from the trailer and carried into the water. Either alternative has obvious disadvantages.

The structure of the present invention permits the prime mover to be parked at a safe distance from the water line and an extensible boom provides a lengthening of the link between the prime mover and the trailer, the boom being articulated when extended so that the trailer and boat can be moved into the water. The trailer structure carries a central wheel or caster which supports the front of the trailer when the boom is extended and which can be moved to a stowed position when the trailer is being towed.

The primary object of the present invention is to provide a boat trailer particularly adapted for launching and recovering small boats under adverse shore line conditions.

A further object of the present invention is to provide an extensible boom trailer having a three-point support when extended and two-point support when contracted for towing.

A further object of the present invention is to provide an extensible boom boat trailer having a hinged or articulated boom permitting launching or recovery of boats from the trailer under adverse shore line conditions.

These and other objects will become apparent as the description proceeds with reference to the accompanying drawings in which:

FIG. 1 is a side view illustrating a trailer embodying the present invention attached to a prime mover.

FIG. 2 is a bottom plan view of the trailer shown in FIG. 1 but omitting the boat carried by the trailer.

FIG. 3 is a side view similar to FIG. 2 but illustrating a position of the trailer components during launching or recovery of a boat.

FIG. 4 is a longitudinal sectional view taken generally along the line 4—4 of FIG. 2.

FIG. 5 is a transverse sectional view taken generally along the line 5—5 of FIG. 4.

FIG. 6 is a sectional view taken generally along the line 6—6 of FIG. 4.

Referring initially to FIGS. 1 and 2, a trailer structure embodying the present invention is indicated generally at 10 and includes a bed structure having side members 11 and transverse members 12 and 13. The bed is provided with a conventional two-wheel support indicated generally at 14. A telescoping boom assembly, indicated generally at 16 extends generally along the longitudinal axis of the bed and is attached thereto. The boom 16 comprises an outer tubular member 17 of substantially the same length as the trailer bed and an inner member 18 nested within the outer member. The inner member 18, at its front end carries a conventional trailer hitch component 19 which, as shown in FIG. 1, may be attached to a prime mover vehicle as indicated generally at 21.

Referring now to FIGS. 2 and 4–6, the detailed structure of the boom assembly includes an annular flange 22 rigidly secured by welding or other suitable means to the inner member 18 and which cooperates with the outer end of the tubular member 17 to limit the depth of insertion of the inner member 18 into the outer member 17. The depth of insertion is also limited by engagement of a block 23 with a closure plate 24 which is welded or otherwise rigidly secured to the rear end of the outer member 17.

The maximum insertion of the inner member 18 into the outer member 17 defines a nested position for the inner member as shown in FIG. 4. The inner member 18, at its inner end, is provided with an extending ear 26 which is apertured to receive a pin 27, the pin also extending through registering apertures in the ear members 28 which extend from the block 23. It will be evident that the structure just described provides an articulated joint whose pivotal axis (at pin 27) is disposed beyond the end of tubular member 17 when the inner member 18 is extended. This permits the inner member 18 to be inclined or pivoted with relation to the block 23 (and hence with relation to the outer member 17) when the inner member is extended from the outer member.

Locking means are provided for retaining the inner member in nested position as shown in FIG. 4 and this locking means includes the screw 29 which extends freely through an aperture 31 in the plate 24 and is threaded into the block 23. The locking means also includes a locking pin which may take the form of the bolt and wing nut 32 which extends through registering apertures in the outer member 17 and the block 23.

Adjacent its front end the outer member 17 has adjustably supported thereon a wheeled caster indicated generally at 36. The caster may be of conventional construction and as here shown includes a generally U-shaped horn structure having vertical legs 37 and an integral transverse portion 38. The legs 37 extend closely adjacent the sides of the outer member 17 and are guided for movement therealong by guide blocks 41 which are welded or otherwise rigidly secured to the adjacent sides of the outer member. The base portion of the horn conventionally supports a wheel 42 which is free to swivel about the vertical axis of the caster. The caster assembly is adjustable vertically with relation to the axis of the member 17 by means of a hand screw 43 which extends upwardly from the member 17 and is mounted thereon so as to permit rotational movement of the screw but to resist axial movement. The screw 43 is threaded through an appropriately placed aperture in the transverse portion 38 of the caster horn. It will be evident from FIG. 4 that with the screw in the position there shown the caster assembly will be drawn upwardly into a maximum upward position and when the caster assembly is to be lowered so that its wheel 42 engages the ground or other supporting surface (as shown in FIG. 3) this may be accomplished by rotation of the hand screw 43.

FIG. 3 illustrates the boom assembly in extended position and from a comparison of FIGS. 3 and 4 it will be evident that this position of the boom assembly is assumed by removal of the screw 29 from the block 23 and removal of the locking pin 32. The inner member 18 may then be withdrawn from the outer member so that the block 23 is positioned adjacent the open, front end of the outer member 17, the annular abutment 50 serving to prevent complete withdrawal of member 18 from member 17. The locking means in the form of the locking pin 32 may then be reinserted through registering apertures (indicated at 46 in FIG. 4) in the outer member 17 and through the aperture in the block 23.

In operation, if the shore area is such that the prime mover cannot be backed into close proximity to the water line, the boom assembly may be moved to its extended position as illustrated in FIG. 3 and the caster may be adjusted so that its wheel 42 engages the ground. Movement of the boom assembly to extended position permits articulation of the inner member 18 so that the outer member 17 and hence the trailer bed may be inclined downwardly and moved into the water to facilitate launching of the boat 51 from the trailer. It will be understood that the trailer bed may include conventional means such as rollers for assisting removal of the boat from the trailer bed.

When the trailer is to be moved to towing position the boom assembly is moved into nested position and locked therein by means of the screw 29 and the locking pin 32, these members being then positioned as shown in FIG. 4. The caster assembly may then be adjusted so that the wheel 42 is raised away from contact with the road surface.

From the foregoing it will be evident that the structure of the present invention provides a means for launching and recovering small boats under adverse shore area conditions. When the boom assembly is locked in nested position, the structure is appropriately rigid and strong for highway towing of the trailer.

While the invention has been disclosed and described in some detail in the drawings and foregoing description, they are to be considered as illustrative and not restrictive in character, as other modifications may readily suggest themselves to persons skilled in this art and within the broad scope of the invention, reference being had to the appended claims.

The invention claimed is:

1. A trailer for transporting boats comprising a two-wheeled bed for supporting a boat, a telescoping boom assembly attached to said bed and extending generally along the longitudinal axis thereof, said boom assembly comprising an outer tubular member of substantially the same length as said trailer, an inner member nested within said outer member and movable from a nested to an extended position with respect thereto, locking means defining said nested position and said extended position of said inner member, said inner member having an articulated joint therein adjacent one of its ends and having means for attachment to a prime mover at its opposite end, the pivotal axis of said articulated joint being disposed beyond the end of said outer tubular member when said inner member is in said extended position, and a support caster adjustably mounted on said outer member adjacent said opposite end of said inner member when said inner member is in said nested position, said caster being vertically adjustable to provide a support point for said boom assembly, whereby when said inner member is moved to said extended position its articulated joint is removed from said outer tubular member to permit inclination of said outer member and the trailer bed with respect to said inner member to thereby facilitate launching or recovery of a boat from the trailer.

2. A trailer for transporting boats comprising a wheeled bed for supporting a boat, a telescoping boom assembly attached to said bed and extending generally along the longitudinal axis thereof, said boom assembly comprising an outer tubular member, an inner member nested within said outer member and movable from a nested to an extended position with respect thereto, locking means defining said nested position and said extended position of said inner member, said inner member having an articulated joint therein adjacent one of its ends and having means for attachment to a prime mover at its opposite end, the pivotal axis of said articulated joint being disposed beyond the end of said outer member when said inner member is in said extended position, and a support caster adjustably mounted on said outer member adjacent said opposite end of said inner member when said inner member is in said nested position, said caster being vertically adjustable to provide a support point for said boom assembly, whereby when said inner member is moved to said extended position its articulated joint is removed from said outer tubular member to permit inclination of said outer member and the trailer bed with respect to said inner member to thereby facilitate launching or recovery of a boat from the trailer.

References Cited in the file of this patent

UNITED STATES PATENTS

| | | |
|---|---|---|
| 1,923,904 | Allen et al. | Aug. 22, 1933 |
| 2,544,185 | Sargent | Mar. 6, 1951 |
| 2,765,942 | Niemeier | Oct. 9, 1956 |
| 2,856,087 | Steber | Oct. 14, 1958 |
| 3,032,353 | Williams et al. | May 1, 1962 |